(12) United States Patent
Chen et al.

(10) Patent No.: US 8,302,117 B2
(45) Date of Patent: Oct. 30, 2012

(54) CASING ASSEMBLING STRUCTURE OF OPTICAL DISC DRIVE

(75) Inventors: Jung-Fu Chen, Hsinchu (TW); Yuan-Syun Luo, Hsinchu (TW); Wei-Chieh Hu, Hsinchu (TW); In-Shuen Lee, Hsinchu (TW)

(73) Assignee: Lite-On IT Corp. (TW)

( * ) Notice: Subject to any disclaimer, the term of this patent is extended or adjusted under 35 U.S.C. 154(b) by 406 days.

(21) Appl. No.: 12/590,078

(22) Filed: Nov. 2, 2009

(65) Prior Publication Data

US 2011/0029992 A1 Feb. 3, 2011

Related U.S. Application Data

(60) Provisional application No. 61/229,711, filed on Jul. 29, 2009.

(51) Int. Cl.
*G11B 33/02* (2006.01)
*H05K 5/00* (2006.01)

(52) U.S. Cl. .............. 720/655; 361/679.31; 720/657
(58) Field of Classification Search ........ 361/679.33–679.39, 679.31; 720/600, 720/652, 654, 655, 657
See application file for complete search history.

(56) References Cited

U.S. PATENT DOCUMENTS

| | | | |
|---|---|---|---|
| 6,219,232 B1 * | 4/2001 | Bang et al. | 361/679.31 |
| 2001/0036145 A1 * | 11/2001 | Otani et al. | 369/219 |
| 2005/0280983 A1 * | 12/2005 | Wang et al. | 361/685 |

* cited by examiner

*Primary Examiner* — Nathan Danielsen
(74) *Attorney, Agent, or Firm* — Raymond Sun

(57) ABSTRACT

A casing assembling structure of an optical disc drive is provided to comprise a bottom cover; a top cover combined with the bottom cover to form a space, wherein the top cover has a first side wall and a fixing portion, which is extended from the first side wall and is positioned under the bottom cover; and a first screw screwed on the fixing portion, wherein the top cover, the first side wall and the fixing portion are formed as a integral.

6 Claims, 5 Drawing Sheets

CASING ASSEMBLING STRUCTURE OF OPTICAL DISC DRIVE

This application claims the benefit of U.S. provisional application Ser. No. 61/229,711, filed Jul. 29, 2009, the subject matter of which is incorporated herein by reference.

BACKGROUND OF THE INVENTION

1. Field of the Invention

The invention relates in general to an optical disc drive, and more particularly to a casing assembling structure of the optical disc drive.

2. Description of the Related Art

As the optical disc is popularly used for storing data, the optical disc drive used for reading/recording data is popular accordingly. The types of optical disc drive are various, and one of which can be installed in the notebook that we called as slim-type optical disc drives. The slim-type optical disc drive installed in the notebook may be usually at a position under the keyboard of the notebook so that user's hands will provide a pressure on the optical disc drive when typing. Therefore, there is a special requirement of support ability of the slim-type optical disc drive. According to the specification of the notebook, the optical disk drive installed in the notebook is asked for enough ability of supporting pressure, especially the strength of the top cover of the optical disc drive.

SUMMARY OF THE INVENTION

Accordingly, the invention provides a casing assembling structure of a slim-type optical disc drive that a top cover of the optical disc drive can support higher pressures. When user is typing, the top cover has less deformation amount and the internal components inside the optical disc drive are protected.

According to a first aspect of the present invention, a casing assembling structure of an optical disc drive is provided to comprise a bottom cover; a top cover combined with the bottom cover to form a space, wherein the top cover has a first side wall and a fixing portion, which is extended from the first side wall and is positioned under the bottom cover; and a first screw screwed on the fixing portion, wherein the top cover, the first side wall and the fixing portion are formed as a integral.

According to a second aspect of the present invention, a casing assembling structure of an optical disc drive is provided to comprise a bottom cover; and a top cover combined with the bottom cover to form a space, wherein the top cover has a protrusion with at least a hole formed on it, and the hole is engaged with a hook of a fixing structure disposed in a notebook when the optical disc drive is installed in the notebook, wherein the top cover and the protrusion are formed as a integral.

BRIEF DESCRIPTION OF THE DRAWINGS

The invention will become apparent from the following detailed description of the preferred but non-limiting embodiments. The following description is made with reference to the accompanying drawings.

DETAILED DESCRIPTION OF THE INVENTION

Figure 1:
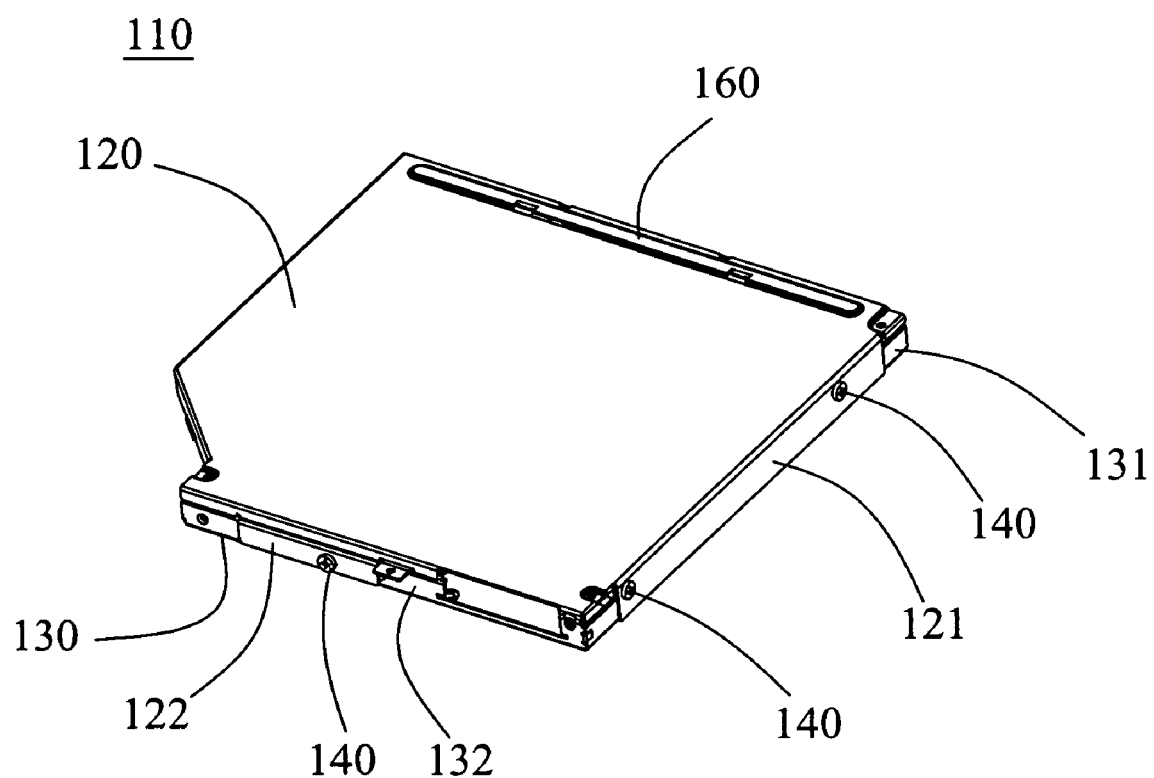
FIG. 1 shows a first angle of view of a casing of an optical disc drive of the present invention.
Figure 2:
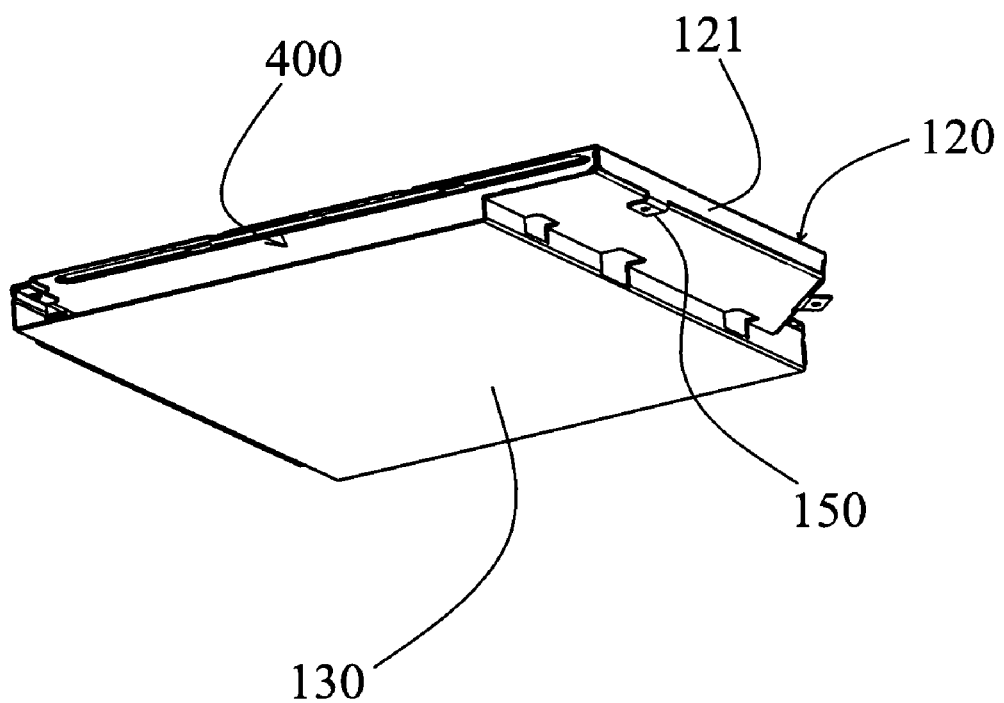
FIG. 2 shows a second angle of view of the casing of the optical disc drive of the present invention.

Please refer to FIG. 1, which shows a first angle of view of a casing 110 of an optical disc drive of the present invention. The casing 110 of optical disc drive is provided to comprising a top cover 120 and a bottom cover 130. Both of the top cover 120 and the bottom cover 130 basically have a U-shape. It means that the top cover 120 and the bottom cover 130 are respectively at least composed of a bottom plate and two side walls at opposite two sides 121, 131 of the casing 110. In the embodiment of present invention, the top cover 120 and the bottom cover 130 further respectively comprises a back side wall 122, 132. The openings of the U-shaped top cover 120 and bottom cover 130 are faced and combined to each other to from a space 400 between them as shown in FIG. 2. The related side walls 121, 131 and back side walls 122, 132 of the top cover 120 and bottom cover 130 are overlapped, and at least a screw 140 is screwed on the side walls to combine the top cover 120 with the bottom cover 130. In the embodiment of present invention, the top cover 120 and the bottom cover 130 are integrally formed respectively.

Further, please refer to FIG. 2, which a second angle of view of the casing 110 of the present invention. The top cover 120 further comprises a fixing portion 150 which is extended from the side wall 121 of the top cover 120 and positioned under the bottom cover 130. A screw 140 is screwed on the fixing portion 150 to combine the top cover 120 with the bottom cover 130 or to fix on the notebook.

Figure 3:
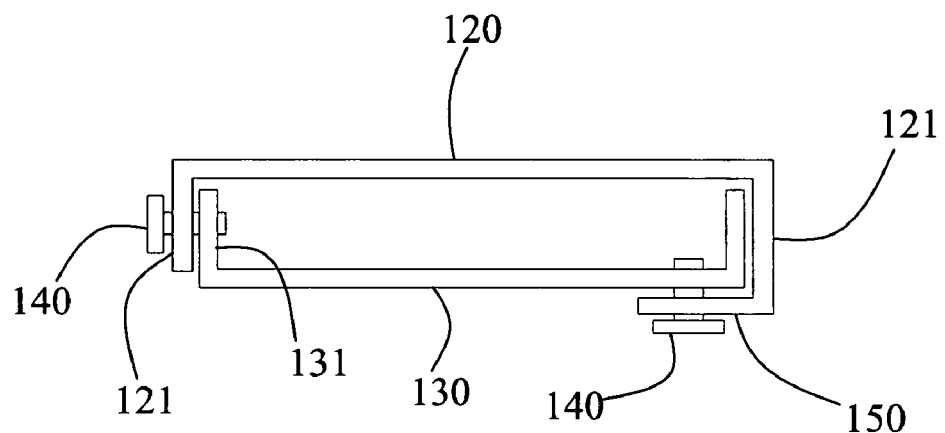
FIG. 3 shows a front cross-section of the casing according to a first embodiment of the present invention.

Please refer to FIG. 3, which shows a front cross-section of the casing according to a first embodiment of the present invention. As shown in FIG. 3, the fixed portion 150 is extended from the side wall 121 of the top cover 120 and is positioned under the bottom cover 130, and a screw 140 is screwed to combine the fixing portion 150 of the top cover 120 with the bottom cover 130. According to the first embodiment of the present invention, the combination between the top cover 120 and the bottom cover 130 is achieved not only by screwing the related side walls 121, 131 together, which also include back side walls 122,132, of the top cover 120 and the bottom cover 130 but also by screwing the fixing portion 150 of the top cover 120 to the bottom cover 130.

Figure 4:
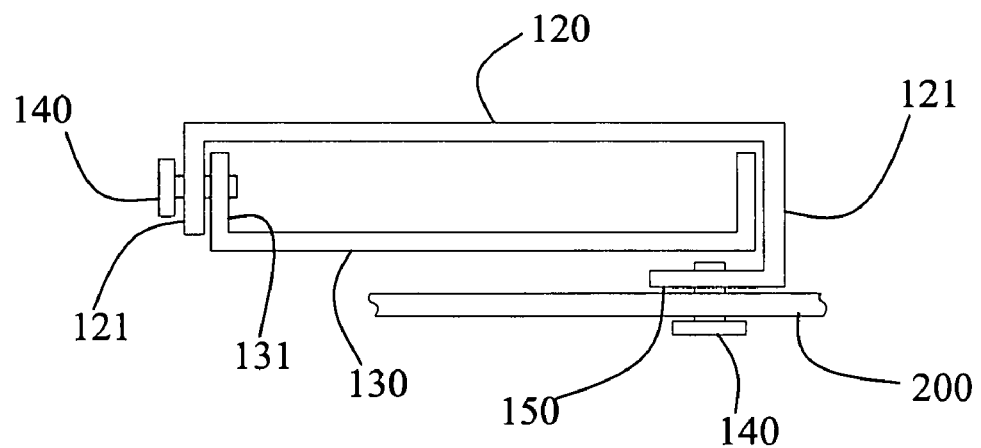
FIG. 4 shows a front cross-section of the casing according to a second embodiment of the present invention.

Please refer to FIG. 4, which shows a front cross-section of the casing according to a second embodiment of the present invention. As shown in FIG. 4, the fixed portion 150 is extended from the side wall 121 of the top cover 120 and is positioned under the bottom cover 130, and a screw 140 is screwed to combine the fixing portion 150 of the top cover 120 with the bottom cover 130. According to the second embodiment of the present invention, the combination between the top cover 120 and the bottom cover 130 is achieved by screwing the related side walls 121, 131 together, which also include back side walls 122,132, of the top cover 120 and the bottom cover 130, and the top cover 120 is further fixed on a fixing structure 200 disposed in a notebook by screwing the fixing portion 150 of the top cover 120 to the fixing structure 200. The fixing structure 200 can be a structure inside the notebook for screwing to the fixing portion 150 of the top cover 120 of the optical disc drive when the optical disc drive is installed in the notebook.

According to the first and the second embodiments described above, as a fixing portion is further formed from the side wall of top cover under the bottom cover and is screwed to the bottom cover or the fixing structure of the notebook, the supporting ability of the top cover of the optical disc drive is increased. Moreover, the deformation amount is decreased comparing with the traditional optical disc drive under the same pressure.

Figure 5:
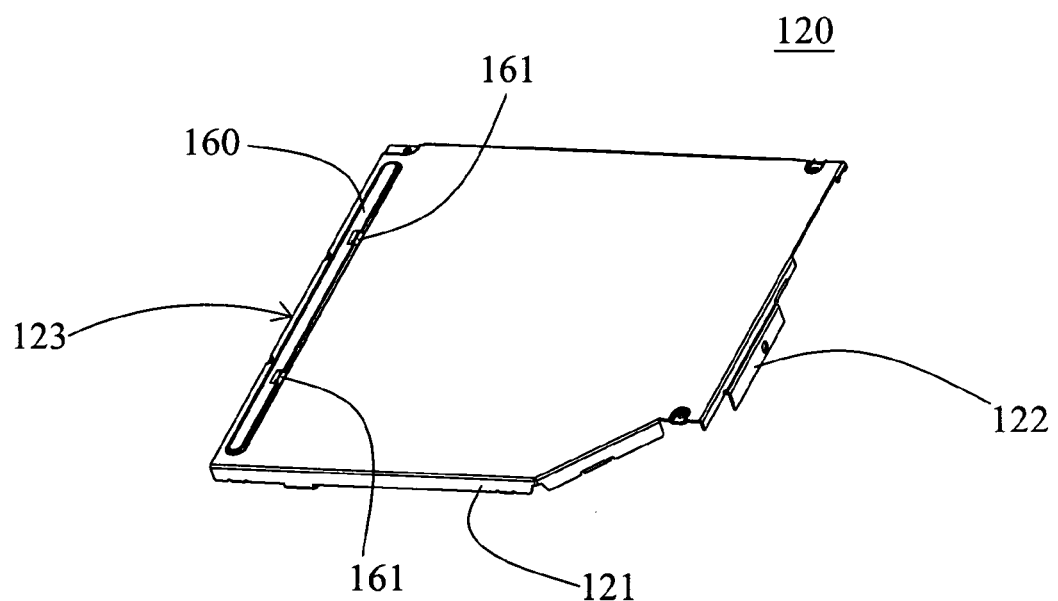
FIG. 5 shows a top cover of the casing according to a third embodiment of the present invention.

Please refer to FIG. 5, which shows a top cover of the casing according to a third embodiment of the present invention. The top cover 120 can comprise a protrusion 160, which is formed on the top cover 120. The protrusion 160 has at least a hole 161. In the third embodiment of the present invention, the protrusion 160 is positioned near the front side 123 of the top cover 120 and is extended along the front side 123. The notebook further comprises another fixing structure 300, and the fixing structure 300 has at least a hook 210 formed on it.

Figure 6:
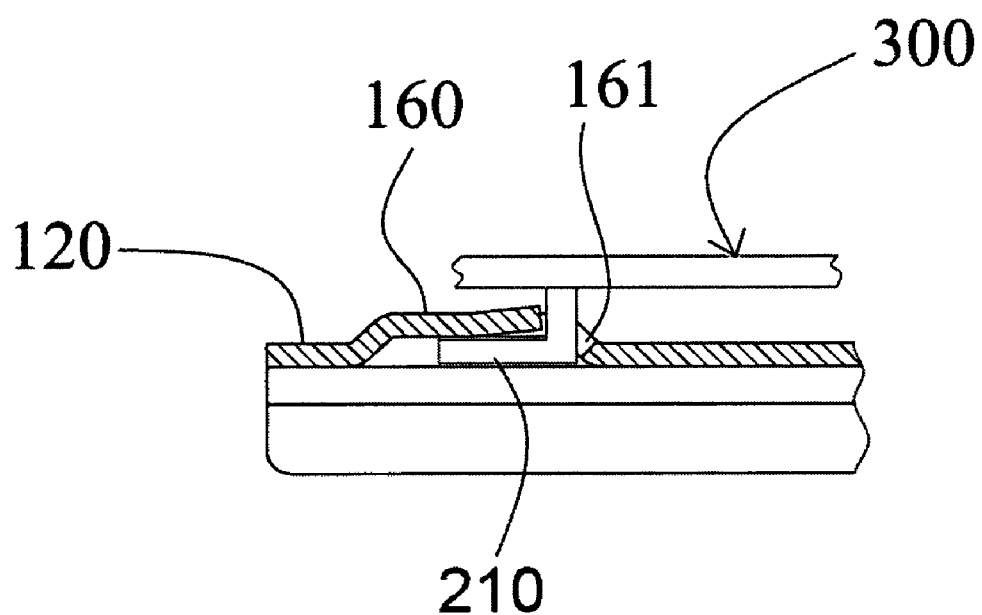
FIG. 6 shows a portion of enlarged view of the top cover of the casing according to the third embodiment of the present invention.

Please refer to FIG. 6, which shows a portion of enlarged view of the top cover of the casing according to the third embodiment of the present invention. When the optical disc drive is installed in the notebook, the hook 210 hooks the related hole 161 so that the top cover 120 can be further supported by the hook 210 disposed in the notebook as there is a pressure providing on the top cover 120. According to the third embodiment, the deformation of the top cover can be prohibited by the supporting of the hook. Therefore, the supporting ability of the top cover of the optical disc drive is increased, and the deformation amount is decreased comparing with the traditional optical disc drive under the same pressure.

The above mentioned features, such like screwing at side or bottom, or having a protrusion formed the top cover, can be implemented alone or by combining any two of them. Also, one can implement all the features on the optical disc drive. The more features the optical disc drive implements, the more strength the top cover has.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A casing assembling structure of an optical disc drive comprising:
   a bottom cover;
   a top cover, combined with the bottom cover to form a space, wherein the top cover has a first side wall and a fixing portion, which is extended from the first side wall and is positioned under the bottom cover; and
   a first screw screwed on the fixing portion, wherein the top cover, the first side wall and the fixing portion are integrally formed.

2. The casing assembling structure of the optical disc drive as claimed in claim 1, wherein the first screw screws the fixing portion to the bottom cover.

3. The casing assembling structure of the optical disc drive as claimed in claim 1, wherein the optical disc drive is installed in a notebook, and the first screw screws the fixing portion to a fixing structure of the notebook.

4. The casing assembling structure of the optical disc drive as claimed in claim 1, wherein the bottom cover has a second side wall, and a second screw screws the first side wall and the second side wall together.

5. The casing assembling structure of the optical disc drive as claimed in claim 1, wherein the top cover further has a protrusion with at least a hole formed on it, and the hole is engaged with a hook of a fixing structure disposed in a notebook when the optical disc drive is installed in the notebook.

6. The casing assembling structure of the optical disc drive as claimed in claim 5, wherein the protrusion is disposed near a front side of the top cover and is extended along the front side.

* * * * *